No. 893,915. PATENTED JULY 21, 1908.
E. M. FRAZEE.
MILK STRAINER.
APPLICATION FILED MAY 11, 1908.
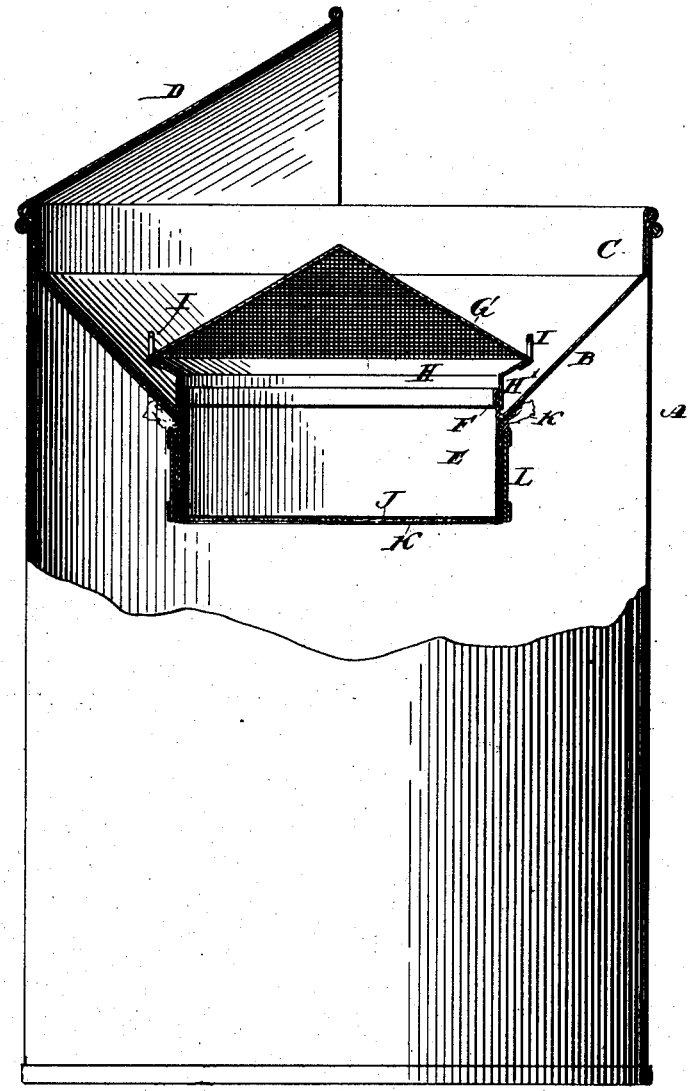
Witnesses
Inventor
Eli M. Frazee
By J. M. St. John
Atty

UNITED STATES PATENT OFFICE.

ELI M. FRAZEE, OF CEDAR RAPIDS, IOWA.

MILK-STRAINER.

No. 893,915.　　　Specification of Letters Patent.　　　Patented July 21, 1908.

Application filed May 11, 1908. Serial No. 432,320.

*To all whom it may concern:*

Be it known that I, ELI M. FRAZEE, a citizen of the United States, residing at Cedar Rapids, in the county of Linn and State of Iowa, have invented certain new and useful Improvements in Milk-Strainers; and I do hereby declare the following to be a full, clear, and exact description of the invention, such as will enable others skilled in the art to which it appertains to make and use the same.

The object of this invention is to provide a strainer adapted for use in connection with a milk-pail, and so constructed as to thoroughly strain the milk direct from the cow, and pass it into the pail free from dirt and foreign matter, and practically free from bacteria.

The nature of the invention is fully disclosed in the description and claims following, reference being had to the accompanying drawing, which illustrates a cross section of a strainer embodying my invention, as applied to a milk-pail.

In the drawing, A denotes an ordinary, straight sided milk-pail, the upper part of which is in section. Fitting the throat on this pail is my improved strainer, described as follows: B is the funnel-shaped body of the device, having at the top a short cylindrical ring C fitting nicely into the throat of the pail. Over about one half of this is a hood D, designed to shield the strainer from dirt from both the cow and the milker. In the bottom of the funnel is a cylindrical part E, which rises some distance from the bottom of the funnel at F, and depends somewhat farther below it, as shown. Over this upwardly projecting rim F is placed a fine wire-gauze strainer, which comprises the conical strainer proper, G, and a flaring ring H, the cylindrical part of which, $H^1$, fits closely, but removably, over the rim F. The upper part of the ring flares, so that the strainer as a whole projects considerably outside the rim. For convenience in removing the strainer, it is provided with a pair of rings or ears I. This construction is such that dirt falling on the strainer is not forced through it into the milk below, but may flow down the conical sides of the strainer and lodge in the annular receptacle below the flared sides of it.

To the bottom of the depending outlet E is attached a supplemental strainer, which in practice is composed of a pad of cotton wadding J and an outer layer of porous cotton cloth, such as cheese cloth K. These are placed over the mouth of the outlet, and are held in place by an outer ring L, in a familiar way. The milk passing through the layers of cotton is very thoroughly cleaned, even to the removal of injurious bacteria, while the chamber above it is of sufficient capacity to allow for the slower flow of milk through it than through the wire gauze.

The strainer as a whole may be easily removed from the pail, and taken apart for cleaning, the inexpensive cotton strainers being thrown away. The functions of these are essentially those of a filter, and they may be so designated in the claims, to distinguish them from the gauze strainer.

Having thus described my invention, I claim:

1. A milk-strainer, comprising a funnel-shaped body, partly hooded over, and adapted to fit in the top of a milk-pail, and having in the bottom of the funnel an upwardly extending rim, a ring fitting said rim, and flared outwardly at the top, and a conical wire-gauze strainer secured to the flared portion of said ring.

2. A milk-strainer, comprising a funnel-shaped body, partly hooded over, and adapted to fit in the top of a milk-pail, and having in the bottom of the funnel a cylindrical part extending up into the funnel and some distance below it, a conical wire-gauze strainer removably mounted on the upwardly extending rim, and a filter as of cotton wadding and cheese-cloth covering the bottom of the cylinder, and attached thereto by an external ring, substantially as and for the purpose set forth.

In testimony whereof I affix my signature in presence of two witnesses.

ELI M. FRAZEE.

Witnesses:
　S. NOVOTNY,
　J. M. ST. JOHN.